(12) United States Patent
Lindholm et al.

(10) Patent No.: US 9,204,484 B2
(45) Date of Patent: Dec. 1, 2015

(54) APPARATUS AND METHOD FOR COMMUNICATION

(75) Inventors: Jari Olavi Lindholm, Palojoki (FI); Timo Erkki Lunttila, Espoo (FI); Antti Anton Toskala, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 535 days.

(21) Appl. No.: 13/499,919

(22) PCT Filed: Oct. 5, 2009

(86) PCT No.: PCT/EP2009/062871
§ 371 (c)(1),
(2), (4) Date: Jun. 11, 2012

(87) PCT Pub. No.: WO2011/042038
PCT Pub. Date: Apr. 14, 2011

(65) Prior Publication Data
US 2012/0250604 A1 Oct. 4, 2012

(51) Int. Cl.
*H04W 84/04* (2009.01)
*H04B 7/26* (2006.01)
(52) U.S. Cl.
CPC ............ *H04W 84/047* (2013.01); *H04B 7/2606* (2013.01)
(58) Field of Classification Search
None
See application file for complete search history.

(56) References Cited

U.S. PATENT DOCUMENTS

| | | | |
|---|---|---|---|
| 2007/0190933 A1* | 8/2007 | Zheng et al. | 455/7 |
| 2008/0080436 A1* | 4/2008 | Sandhu et al. | 370/338 |
| 2009/0109892 A1* | 4/2009 | Oyman et al. | 370/315 |
| 2010/0080139 A1* | 4/2010 | Palanki et al. | 370/252 |

OTHER PUBLICATIONS

3GPP TR 36.806 V0.1.0 (Sep. 2009), "3rd Generation Partnership Project; Technical specification Group Radio Access Network; Evolved Universal Terrestrial Radio Access (E-UTRA); Relay Architectures for E-UTRA (LTE-Advanced) (Release 9)", 20 pgs.
Hoymann, Christian, et al., "A Self-Backhauling Solution for LTE-Advanced", Wireless World Research Forum 21-WG4-07, Oct. 13, 2008, 5 pgs.

* cited by examiner

*Primary Examiner* — Chirag Shah
*Assistant Examiner* — Rina Pancholi
(74) *Attorney, Agent, or Firm* — Harrington & Smith

(57) ABSTRACT

An apparatus and a method for communication are provided. The apparatus is configured to: communicate with a network via a cell created by a relay node; receive from the relay node information required in reception of backhaul transmission sent by a base station of the network to the relay node, the transmission including at least one data packet designated to the apparatus and in decoding of the at least one data packet; receive a backhaul transmission sent by a base station of the network to the relay node and decode the at least one data packet from the transmission.

16 Claims, 4 Drawing Sheets

APPARATUS AND METHOD FOR COMMUNICATION

FIELD

The exemplary and non-limiting embodiments of the invention relate generally to wireless communication networks. Embodiments of the invention relate especially to networks utilizing relay nodes.

BACKGROUND

Wireless communication systems are constantly under development. Developing systems provide a cost-effective support of high data rates and efficient resource utilization. One communication system under development is the 3rd Generation Partnership Project (3GPP) Long Term Evolution (LTE) Release 8. An improved version of the Long Term Evolution radio access system is called LTE-Advanced (LTE-A). The LTE is designed to support various services, such as high-speed data, multimedia unicast and multimedia broadcast services.

In LTE-A, the use of relay nodes (RN) has been proposed to enhance coverage and/or throughput. Relay nodes communicate wirelessly with a base station (or eNodeB) and communicate with user equipment on behalf of the base station. Relay nodes may be used to provide a larger coverage without the need to install a complete station.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus configured to: communicate with a network via a cell created by a relay node; receive from the relay node information required in reception of backhaul transmission sent by a base station of the network to the relay node, the transmission comprising at least one data packet designated to the apparatus and in decoding of the at least one data packet; receive a backhaul transmission sent by a base station of the network to the relay node, decode the at least one data packet from the transmission.

In an embodiment, the apparatus is configured to send an acknowledgement to the relay node regarding a data packet successfully decoded from the backhaul transmission.

According to an aspect of the present invention, there is provided an apparatus configured to: maintain a cell in a network; receive a backhaul transmission from a base station of the network, the transmission comprising data packets designated to user equipment communicating with a relay node, and receive acknowledgement from the user equipment relating to data packets the user equipment received directly from the base station.

In an embodiment, the apparatus is configured to transmit to the user equipment data relating to a channel and/or frame structure of the backhaul transmission.

According to another aspect of the present invention, there is provided a method comprising: communicating with a network via a cell created by a relay node; receiving from the relay node information required in reception of backhaul transmission sent by a base station of the network to the relay node, the transmission comprising at least one data packet designated to the apparatus and in decoding of the at least one data packet; receiving a backhaul transmission sent by a base station of the network to the relay node, decoding the at least one data packet from the transmission.

According to another aspect of the present invention, there is provided a method comprising: maintaining a cell in a network; receiving a backhaul transmission from a base station of the network, the transmission comprising data packets designated to user equipment communicating with a relay node, and receiving acknowledgement from the user equipment relating to data packets the user equipment received directly from the base station.

According to another aspect of the present invention, there is provided an apparatus comprising: means for communicating with a network via a cell created by a relay node; means for receiving a backhaul transmission sent by a base station of the network to the relay node, the transmission comprising at least one data packet designated to the apparatus, means for decoding the at least one data packet from the transmission.

According to another aspect of the present invention, there is provided an apparatus comprising at least one processor and at least one memory including computer program code and operatively connected to the processor, the at least one memory and the computer program code being configured to, with the at least one processor, cause the apparatus at least to communicate with a network via a cell created by a relay node; receive a backhaul transmission sent by a base station of the network to the relay node, the transmission comprising at least one data packet designated to the apparatus, decode the at least one data packet from the transmission.

According to another aspect of the present invention, there is provided a computer readable memory embodying a program of instructions executable by a processor to perform actions comprising: communicating with a network via a cell created by a relay node; receiving a backhaul transmission sent by a base station of the network to the relay node, the transmission comprising at least one data packet designated to the apparatus, decoding the at least one data packet from the transmission.

LIST OF DRAWINGS

Embodiments of the present invention are described below, by way of example only, with reference to the accompanying drawings, in which FIGS. 1A and 1B show simplified block diagrams illustrating exemplary system architectures;

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of the present invention are applicable to any user terminal, server, corresponding component, and/or to any communication system or any combination of different communication systems where relay nodes are utilized. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Figure 1A:
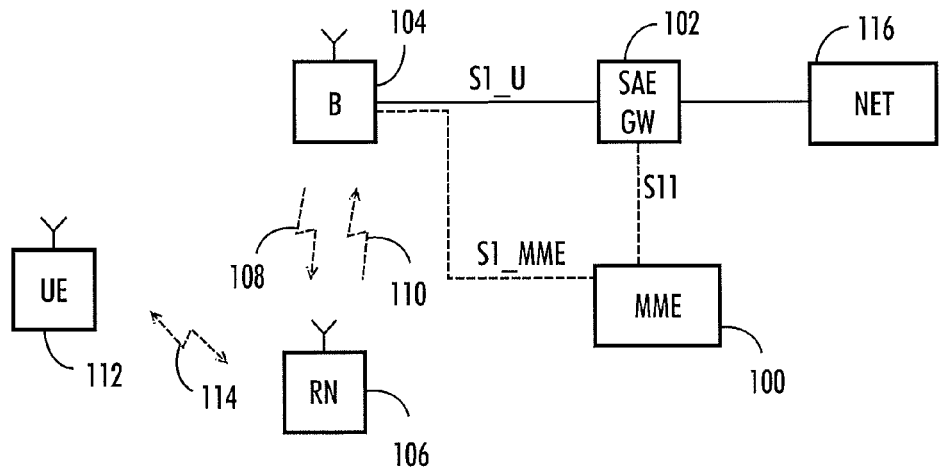

With reference to FIG. 1A, let us examine an example of a radio system to which embodiments of the invention can be applied. In this example, the radio system is based on LTE network elements. However, the invention described in these examples is not limited to the LTE radio systems but can also be implemented in other radio systems.

A general architecture of a communication system is illustrated in FIG. 1A. FIG. 1A is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The exemplary radio system of FIG. 1A comprises a service core of an operator including the following elements: an MME (Mobility Management Entity) 100 and an SAE GW (SAE Gateway) 102.

Base stations that may also be called eNBs or eNodeBs (Enhanced node Bs) 104 of the radio system host the functions for Radio Resource Management: Radio Bearer Control, Radio Admission Control, Connection Mobility Control, Dynamic Resource Allocation (scheduling). The MME 100 is responsible for distributing paging messages to the eNodeB 104. The eNodeB is connected to the SAE GW with an S1_U interface and to the MME with an S1_MME interface. eNodeBs of a system may be connected to each other with an X2 interface (not shown).

The system of FIG. 1A comprises a relay node (RN) 106. The relay node 106 is wirelessly 108, 110 connected to the eNodeB 104. The relay node 106 is used to provide an additional coverage area and enhanced throughput which the eNodeB is unable to provide on its own. User equipment 112 may be connected to the relay node 106 when communicating with the system. In an embodiment, the relay node 106 creates and controls a cell of its own. Thus, to the user equipment of the system, the cell of the relay node appears to be a separate cell distinct from the cell of the eNodeB 104. The cell of the relay node may have a physical cell identification separate from the ID of the cell of the eNodeB 104. In addition, the relay node may transmit its own control channels and reference symbols.

The user equipment of the system may detect that the cell provided by the relay node 106 is not a cell maintained by a regular eNodeB but by a relay node.

The eNodeB 104 transmits to the relay node 106 backhaul trans-mission 108 comprising information intended to user equipment connected to the relay node 106. The relay node is configured to communicate 114 wirelessly with the user equipment 112. Thus, the backhaul transmission 108 comprises all the downlink traffic of the user equipment. The relay node relays 114 the downlink traffic to the user equipment. The uplink traffic is sent 114 by the user equipment to the relay node which in turn relays 110 the traffic to the eNodeB.

The user equipment 112 is configured to communicate with the network via the relay node 106. The communication 114 may comprise control and traffic channels and it corresponds to a connection to an eNodeB.

The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

In the exemplary situation of FIG. 1A, the user equipment 112 has a connection to the eNodeB 104 via the relay node 106. The connection may relate to a call/a service which may be "long distance" where user traffic passes via the SAE GW 102. For example, a connection from the user equipment 112 to an external IP network, such as to the Internet 116, may be guided via the SAE GW 102. However, local calls/services are also possible in the exemplary radio system.

FIG. 1A only illustrates a simplified example. In practice, the network may include more base stations and network elements, and more cells may be formed by the base stations. The networks of two or more operators may overlap, the sizes and form of the cells may vary from what is depicted in FIG. 1A, etc.

The physical layer of the LTE includes orthogonal frequency division multiple access (OFDMA) and multiple-input and multiple-output (MIMO) data transmission. For example, the LTE deploys the OFDMA for the downlink transmission and single carrier frequency division multiple access (SC-FDMA) for the uplink transmission. In OFDMA, the transmission frequency band is divided into multiple sub-carriers orthogonal to each other. Each sub-carrier may transmit data to specific UE. Thus, multiple access is achieved by assigning subsets of sub-carriers to any individual UE. SC-FDMA utilizes single carrier modulation, orthogonal frequency domain multiplexing and frequency domain equalization. Embodiments of the invention are not limited to any particular multiple access method.

It should be appreciated that the communication system may also comprise other core network elements besides SAE GW 102 and MME 100. Direct communication between different eNodeBs over an air interface is also possible. The communication system is also able to communicate with other networks, such as a public switched telephone network.

Figure 1B:
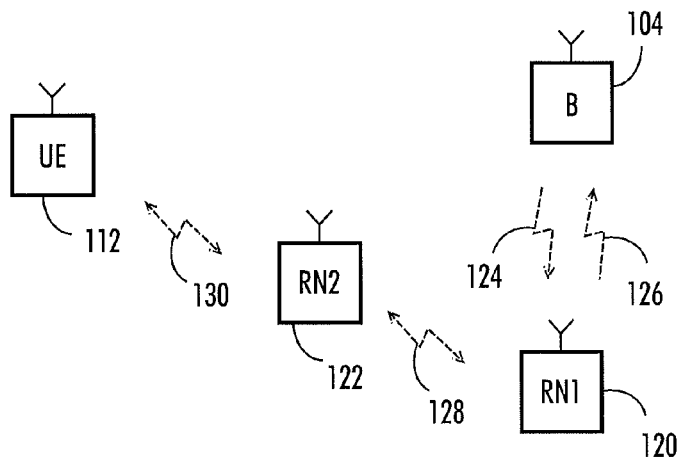

FIG. 1B illustrates an example where multihop relay nodes are utilized. FIG. 1B shows an eNodeB 104 and two relay nodes 120, 122. The first relay node 120 is wirelessly 124, 126 connected to the eNodeB 104. User equipment may be connected to the first relay node 120 when communicating with the system. The first relay node 120 is wirelessly 128 connected also to a second relay node 122. The first relay node 120 transmits backhaul traffic of the second relay node wirelessly 128 to the second relay node 122.

In the example of FIG. 1B, user equipment 112 is connected 130 to the second relay node 122 when communicating with the system. The eNodeB 104 transmits the backhaul traffic intended to the user equipment 112 to the first relay node 120. The first relay node 120 transmits the backhaul traffic wirelessly 128 to the second relay node 122. The second relay node transmits the downlink signal to the user equipment 112.

In a multihop system, the number of relay nodes in the transmission chain is not restricted to any particular number of relay nodes.

The embodiments are not, however, restricted to the network given above as an example, but a person skilled in the art may apply the solution to other communication networks provided with the necessary properties. For example, the connections between different network elements may be realized with Internet Protocol (IP) connections.

Figure 2:
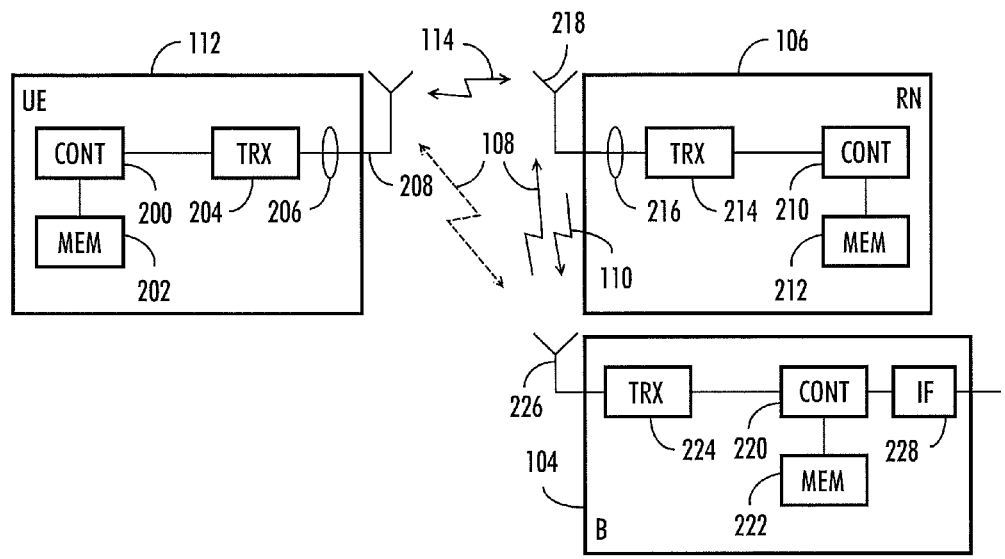
FIG. 2 illustrates examples of apparatuses according to embodiments of the invention.

FIG. 2 illustrates examples of apparatuses according to embodiments of the invention. FIG. 2 shows user equipment 112. The user equipment is configured to be in connection with the relay node 106. The user equipment 112 comprises a controller 200 operationally connected to a memory 202 and a transceiver 204. The controller 200 controls the operation of the user equipment. The memory 202 is configured to store software and data. The transceiver is configured to set up and maintain a wireless connection to the relay node 106. The transceiver is operationally connected to a set of antenna ports 206 connected to an antenna arrangement 208. The antenna arrangement 208 may comprise a set of antennas. The number of antennas may be one to four, for example. The number of antennas is not limited to any particular number.

The user equipment may also comprise various other components, such as a user interface, camera, and media player. For the sake of simplicity, they are not displayed in the figure.

The relay node 106 comprises a controller 210 operationally connected to a memory 212 and a transceiver 214. The controller 210 controls the operation of the base station. The memory 212 is configured to store software and data. The transceiver 214 is configured to set up and maintain a wireless connection 114 to user equipment. The transceiver is operationally connected to a set of antenna ports 216 connected to an antenna arrangement 218. The antenna arrangement may comprise a set of antennas. The number of antennas may be two to four, for example. The number of antennas is not limited to any particular number.

The transceiver 214 is further configured to receive backhaul trans-mission 108 from the eNodeB 104, the transmission comprising data packets designated to user equipment communicating with the relay node. In addition, the transceiver 214 is further configured to transmit 110 data received from the user equipment to the eNodeB 104.

The base station or eNodeB 104 comprises a controller 220 operationally connected to a memory 222 and a transceiver 224. The controller 220 controls the operation of the base station. The memory 222 is configured to store software and data. The transceiver 224 is configured to set up and maintain a wireless connection to a relay node 106 by transmitting backhaul trans-mission 108 to the relay node 106, the transmission comprising data packets designated to user equipment communicating with the relay node. In addition, the transceiver 224 is further configured to receive transmission 110 from the relay node, the transmission comprising data the relay node has received from the user equipment.

The transceiver 224 is operationally connected to an antenna arrangement 226. The antenna arrangement may comprise a set of antennas. The number of antennas may be two to four, for example. The number of antennas is not limited to any particular number.

The eNodeB 104 may be operationally connected to another network element of the communication system. The network element may be an MME (Mobility Management Entity), an SAE GW (SAE Gateway), a radio network controller (RNC), another base station, a gateway, or a server, for example. The eNodeB 104 may be connected to more than one network element. The eNodeB 104 may comprise an interface 228 configured to set up and maintain connections with the network elements.

In an embodiment, the transceiver 204 of the user equipment of the network may be configured to receive the backhaul transmission 108 sent by the eNodeB 104 of the network to the relay node 106, the transmission comprising at least one data packet designated to the user equipment. As the backhaul transmission is not conventional transmission intended to be received by user equipment of the network but a separate link between an eNodeB and a relay node, the user equipment must be able to understand the control channel and shared channel structure of the backhaul link 108. In addition, the user equipment must be able to decipher the data packet that is transmitted in the backhaul link and designated to the user equipment.

Referring to the multihop relay node example of FIG. 1B, the user equipment 112 may receive the backhaul transmission originating from the first relay node 120 or the eNodeB 104 or both.

In an embodiment, the downlink transmissions from the eNodeB 104 and the relay node 106 are time division multiplexed so that the user equipment 112 can receive downlink transmissions from both sources. In an embodiment, also uplink transmissions are time division multiplexed.

Figure 3:
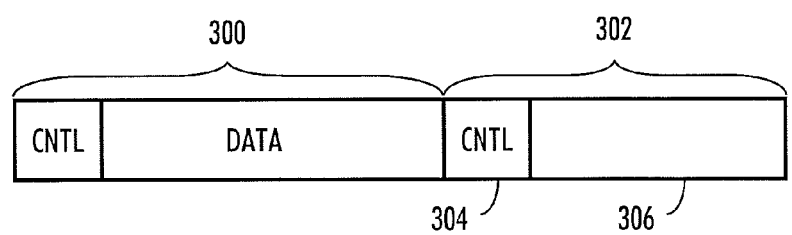
FIG. 3 illustrates an example of backhaul transmission.

In an embodiment, the backhaul transmissions from the eNodeB 104 to the relay node 106 are transmitted on the same frequency band as the downlink transmissions from the relay node to the user equipment. FIG. 3 illustrates this embodiment. FIG. 3 shows two successive subframes 300, 302. In the first subframe 300, the relay node transmits downlink traffic to the user equipment. In the second subframe, the relay node first transmits control information to the user equipment in the first time slots 304. In the following time slots 306, the relay node receives backhaul transmission from the eNodeB. Thus, during these time slots the relay node is not transmitting downlink traffic to the user equipment and the user equipment may be able to capture the backhaul transmission. In an embodiment, the second subframe is configured as a MBSFN (Multi-Media Broadcast over a Single Frequency Network) subframe. MBSFN is a service which may be used to transmit broadcast multimedia services within a cell of a cellular system. However, in this embodiment any broadcast media is not sent in the subframe. In an embodiment, the first two time slots 304 may be used to transmit PDCCH (Physical Downlink Control Channel).

Figure 4A:
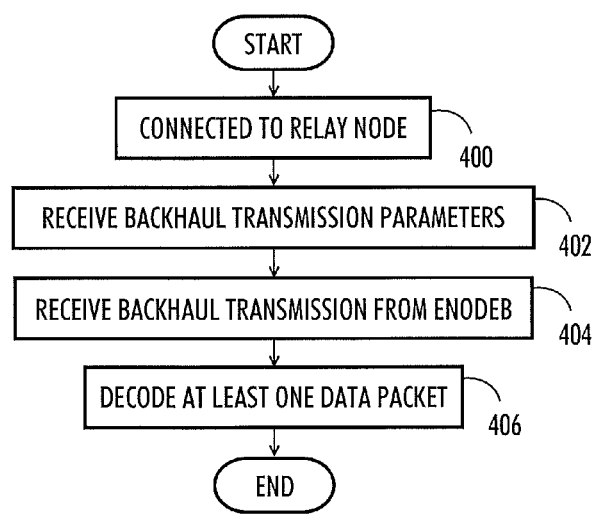
FIGS. 4A, 4B, 5A and 5B are flowcharts illustrating embodiments of the invention.

FIG. 4A is a flow chart illustrating an embodiment.

In step 400, user equipment 112 is connected to and communicating with a network via a relay node 106. A controller 200 of the user equipment controls a transceiver 204 to communicate with the relay node.

In step 402, the user equipment receives backhaul transmission parameters from the relay node. The parameters enable the user equipment to receive and decode the backhaul transmission. The controller 200 of the user equipment may be configured to store the parameters in a memory 202. In order to receive backhaul data, the user equipment 112 must be aware of the control channel and shared channel structure of the backhaul link. Also, the user equipment must be able to decipher a data packet that is transmitted in the backhaul link.

In step 404, the controller 200 of the user equipment controls the transceiver 204 to receive the backhaul transmission.

In step 406, the controller 200 controls the user equipment to decode a data packet designated to the user equipment.

Figure 4B:
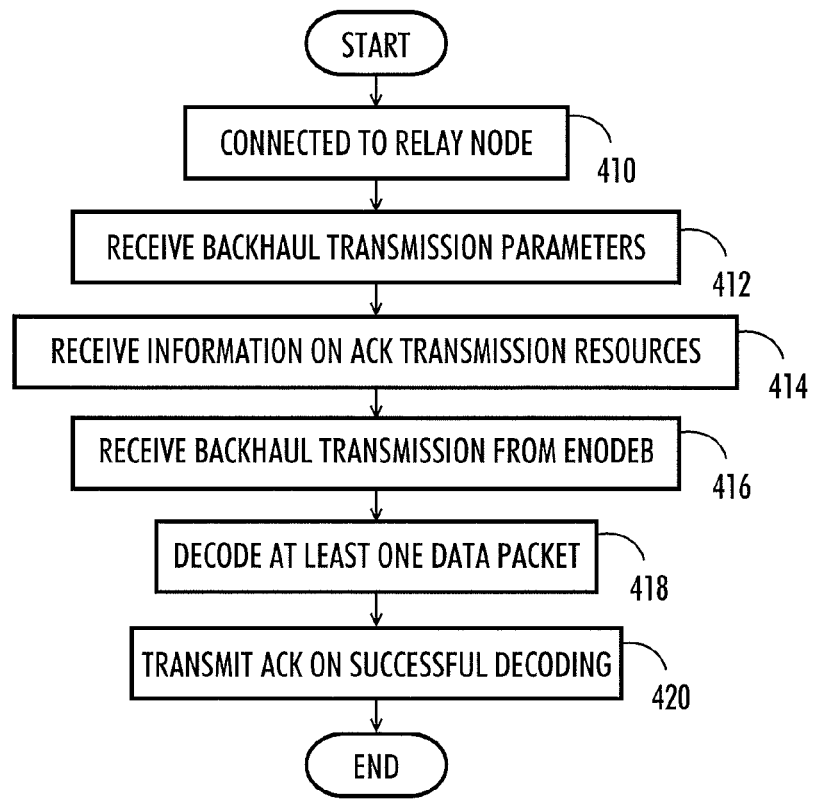

FIG. 4B is a flow chart illustrating another embodiment. Below, steps 410, 412, 416 and 418 correspond to steps 400, 402, 404 and 406 of FIG. 4A, respectively. For the sake of clarity, the steps have been renumbered in FIG. 4B.

In step 410, user equipment 112 is connected to and communicating with a network via a relay node 106. A controller 200 of the user equipment controls a transceiver 204 to communicate with the relay node.

In step 412, the user equipment receives backhaul transmission parameters from the relay node.

In step 414, the user equipment receives from the relay node information regarding transmission resources for the user equipment to transmit acknowledgements. The controller 200 of the user equipment may be configured to store the parameters in a memory 202.

In step 416, the controller 200 of the user equipment controls the transceiver 204 to receive the backhaul transmission.

In step 418, the controller 200 controls the user equipment to decode a data packet designated to the user equipment.

If the packet was successfully received and decoded the controller 200 controls the transceiver 204 in step 420 to transmit an acknowledgement to the relay node.

Figure 5A:
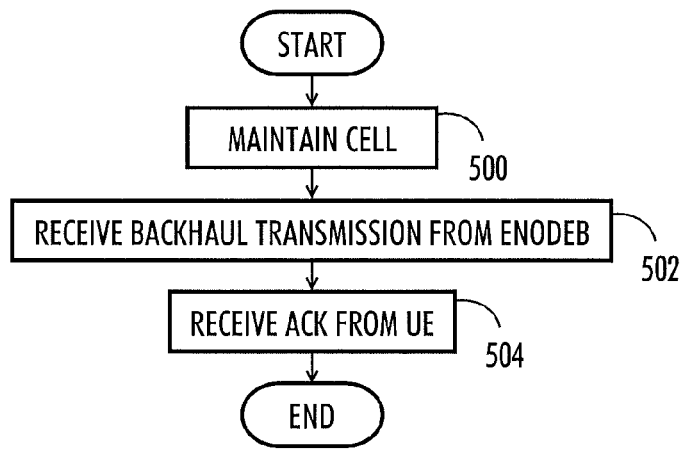

FIG. 5A is a flow chart illustrating an embodiment.

In step 500, a relay node maintains a cell in a network.

In step 502, a controller 210 of the relay node controls a transceiver 214 to receive a backhaul transmission from an eNodeB of the network, the transmission comprising data packets designated to user equipment communicating with the relay node.

In step 504, the transceiver 214 receives an acknowledgement from the user equipment relating to data packets the user equipment received directly from an eNodeB.

Figure 5B:
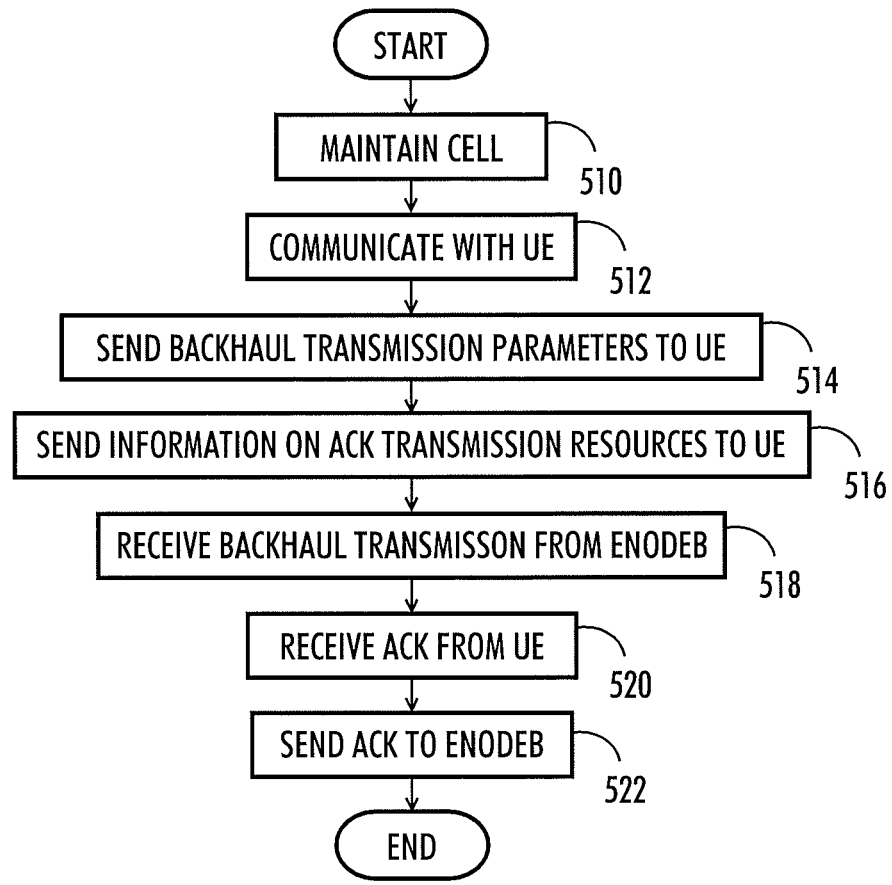

FIG. 5B is a flow chart illustrating another embodiment. Below, steps 510, 518 and 520 correspond to steps 500, 502 and 504 of FIG. 5A, respectively. For the sake of clarity, the steps have been renumbered in FIG. 5B.

In step 510, a relay node maintains a cell in a network.

In step 512, the relay node is connected to and communicates with user equipment.

In step 514, a controller 210 of the relay node controls a transceiver 214 to transmit backhaul transmission parameters to the user equipment. The parameters enable the user equipment to receive and decode the backhaul transmission.

In step 516, the controller 210 reserves transmission resources for the user equipment to transmit acknowledgements. The user equipment 112 should transmit an acknowledgement regarding a received backhaul signal at such a subframe when the relay node is receiving user equipment transmissions and not transmitting to an eNodeB. The controller controls the transceiver 214 to transmit information regarding the resources to the user equipment.

In step 518, the controller 210 of the relay node controls the transceiver 214 to receive a backhaul transmission from an eNodeB of the network, the transmission comprising data packets designated to user equipment communicating with the relay node.

In step 520, the transceiver 214 receives an acknowledgement from the user equipment relating to data packets the user equipment received directly from an eNodeB.

In step 522, the transceiver 214 sends the acknowledgement received from the user equipment to the eNodeB 104.

In an embodiment, the user equipment is configured to send an acknowledgement (ACK) to the relay node if it successfully decodes a data packet. Because sometimes user equipment may not be able to receive a backhaul link at all, the operation could be such that only ACK is sent to a relay node and nothing if reception is not successful. Thus, no negative acknowledgement (NACK) is sent to a relay node in the case of a failure to decode a data packet.

In an embodiment, scheduling request type of uplink control signaling (on-off keying) can be used to realize the acknowledgement procedure. The ACK resource can be reserved by a relay node or there can be some kind of implicit mapping that determines an ACK resource. As an example, the resource may be based on the logical index/position of the backhaul data or by setting an offset with respect to the implicit relay node or backhaul ACK/NACK resource or a relay node can configure the ACK resource to be used by higher layer signaling.

The steps and related functions described in the attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

In an embodiment, the relay node comprises at least one processor and at least one memory including computer program code and operatively connected to the processor, the at least one memory and the computer program code being configured to, with the at least one processor, cause the apparatus at least to maintain a cell in a network; receive from the relay node information required in reception of backhaul transmission sent by a base station of the network to the relay node, the transmission comprising at least one data packet designated to the apparatus and in decoding of the at least one data packet; receive a backhaul transmission from a base station of the network, and receive an acknowledgement from user equipment relating to data packets the user equipment received directly from the base station.

In an embodiment, the relay node comprises means for maintaining a cell in a network; means for receiving a backhaul transmission from a base station of the network, the transmission comprising data packets designated to user equipment communicating with the relay node, and means for receiving an acknowledgement from user equipment relating to data packets the user equipment received directly from the base station.

According to an aspect of the present invention, there is provided a radio system, comprising at least one base station, at least one relay node and at least one set of user equipment, the relay node being configured to maintain a cell in a network and receive a backhaul transmission from a base station of the system, the transmission comprising data packets designated to user equipment communicating with the relay node; the user equipment being configured to communicate with the system via a cell created by a relay node; receive from the relay node information required in reception of backhaul transmission sent by a base station of the network to the relay node, the transmission comprising at least one data packet designated to the apparatus and in decoding of the at least one data packet; receive the backhaul transmission sent by the base station of the system to the relay node, decode the at least one data packet from the transmission and send an acknowledgement to a relay node regarding a successfully decoded data packet; and the relay node is configured to receive the acknowledgement from the user equipment.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatuses described above may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including computer program code, the at least one memory and the computer program code configured, with the at least one processor, to cause the apparatus to perform the following:
   communicate with a network via a cell created and controlled by a relay node, wherein the relay node conveys data from the apparatus to the network;
   receive from the relay node backhaul transmission parameters required to receive a backhaul transmission sent by a base station of the network to the relay node, and to decode at least one data packet comprised in the backhaul transmission and designated for the apparatus;
   receive directly the backhaul transmission sent by the base station of the network, wherein the backhaul transmission is intended for the relay node and not for the apparatus; and
   decode the at least one data packet from the backhaul transmission.

2. The apparatus of claim 1, wherein the at least one memory and the computer program code are further configured, with the at least one processor, to cause the apparatus to send an acknowledgement to the relay node regarding a data packet successfully decoded from the backhaul transmission.

3. The apparatus of claim 1, wherein the at least one memory and the computer program code are further configured, with the at least one processor, to cause the apparatus to send no acknowledgement to a relay node regarding an unsuccessfully decoded data packet.

4. An apparatus comprising:
   at least one processor; and
   at least one memory including computer program code, the at least one memory and the computer program code configured, with the at least one processor, to cause the apparatus to perform the following:
   maintain and control a cell in a network for a user equipment to communicate with the network via the cell;
   convey data from the user equipment to the network;
   transmit, to the user equipment, backhaul transmission parameters required by the user equipment to receive a backhaul transmission sent by a base station of the network to the apparatus, and to decode at least one data packet comprised in the backhaul transmission and designated for the user equipment;
   receive the backhaul transmission from the base station of the network, the backhaul transmission comprising data packets designated for the user equipment communicating with the apparatus; and
   receive acknowledgement from the user equipment relating to the data packets the user equipment received directly in the backhaul transmission from the base station intended for the apparatus and not for the user equipment.

5. The apparatus of claim 4, wherein the at least one memory and the computer program code are further configured, with the at least one processor, to cause the apparatus to transmit to the user equipment data relating to a channel and/or frame structure of the backhaul transmission.

6. The apparatus of claim 4, wherein the at least one memory and the computer program code are further configured, with the at least one processor, to cause the apparatus to reserve transmission resources for the user equipment to transmit the acknowledgement.

7. The apparatus of claim 4, wherein the at least one memory and the computer program code are further configured, with the at least one processor, to cause the apparatus to send the acknowledgement received from the user equipment to the base station.

8. A method comprising:
   communicating by an apparatus with a network via a cell created and controlled by a relay node, wherein the relay node conveys data to the network;
   receiving by the apparatus from the relay node backhaul transmission parameters required to receive a backhaul transmission sent by a base station of the network to the relay node, and to decode at least one data packet comprised in the backhaul transmission and designated for the apparatus;
   receiving directly by the apparatus the backhaul transmission sent by the base station of the network, wherein the backhaul transmission is intended for the relay node and not for the apparatus; and
   decoding by the apparatus the at least one data packet from the backhaul transmission.

9. The method of claim 8, further comprising:
   sending an acknowledgement to the relay node regarding a data packet successfully decoded from the backhaul transmission.

10. A method comprising:
    maintaining and controlling a cell by a relay node in a network for a user equipment to communicate with the network via the cell;

conveying by the relay node, data from the user equipment to the network;

transmitting, to the user equipment, backhaul transmission parameters required by the user equipment to receive a backhaul transmission sent by a base station of the network to the relay node, and to decode at least one data packet comprised in the backhaul transmission and designated for the user equipment;

receiving the backhaul transmission from the base station of the network, the backhaul transmission comprising data packets designated for the user equipment communicating with the relay node; and receiving acknowledgement from the user equipment relating to the data packets the user equipment received directly in the backhaul transmission from the base station intended for the relay node and not for the user equipment.

11. The method of claim 10, further comprising:
transmitting to the user equipment data relating to a channel and/or frame structure of the backhaul transmission.

12. The method of claim 10, further comprising:
reserving transmission resources for the user equipment to transmit the acknowledgement.

13. The method of claim 10, further comprising:
sending the acknowledgement received from the user equipment to the base station.

14. A non-transitory computer readable memory embodying a program of instructions executable by a processor to perform actions comprising:

communicating with a network via a cell created and controlled by a relay node, wherein the relay node conveys data from an apparatus to the network;

receiving by the apparatus from the relay node backhaul transmission parameters required to receive a backhaul transmission sent by a base station of the network to the relay node, and to decode at least one data packet comprised in the backhaul transmission and designated for the apparatus;

receiving directly by the apparatus the backhaul transmission sent by the base station of the network, wherein the backhaul transmission is intended for the relay node and not for the apparatus; and decoding by the apparatus the at least one data packet from the backhaul transmission.

15. A computer program product comprising a non-transitory computer-readable storage medium bearing computer program code embodied therein for use with a computer, the computer program code comprising code for performing the method according to claim 8.

16. A computer program product comprising a non-transitory computer-readable storage medium bearing computer program code embodied therein for use with a computer, the computer program code comprising code for performing the method according to claim 10.

* * * * *